United States Patent [19]

Hosoya

[11] Patent Number: 4,459,610
[45] Date of Patent: Jul. 10, 1984

[54] SATURATION AND CONTRAST ADJUSTING CIRCUIT

[75] Inventor: Nobukazu Hosoya, Nara, Japan

[73] Assignee: Sanyo Electric Co., Ltd., Osaka, Japan

[21] Appl. No.: 371,293

[22] PCT Filed: Sep. 8, 1981

[86] PCT No.: PCT/JP81/00222
  § 371 Date: Apr. 5, 1982
  § 102(e) Date: Apr. 5, 1982

[87] PCT Pub. No.: WO82/00934
  PCT Pub. Date: Mar. 18, 1982

[30] Foreign Application Priority Data

Sep. 8, 1980 [JP] Japan ............................... 55-124937

[51] Int. Cl.³ ........................................ H04N 9/535
[52] U.S. Cl. ................................................ 358/27
[58] Field of Search .................. 358/27, 39, 40, 169, 358/25

[56] References Cited

FOREIGN PATENT DOCUMENTS 51-3705  3/1976  Japan .
1407272  8/1975  United Kingdom ................. 358/39

Primary Examiner—John C. Martin
Assistant Examiner—E. A. McDowell
Attorney, Agent, or Firm—Armstrong, Nikaido, Marmelstein & Kubovcik

[57] ABSTRACT

A saturation and contrast adjusting circuit for a color television receiver set comprises a chroma processing circuit branched off from a contrast adjusting circuit connected to a video detector circuit of the color television receiver set. A control signal of the contrast adjusting circuit is released during the burst period to enable the contrast and saturation adjustment to be carried out by such control signal. The saturation and contrast can be adjusted by a single gain adjusting circuit and the respective control characteristic curves of the contrast adjusting circuit and the chroma processing circuit can be brought into coincidence with each other.

3 Claims, 6 Drawing Figures

SATURATION AND CONTRAST ADJUSTING CIRCUIT

FIELD OF THE ART

The present invention relates to a color saturation and contrast adjusting circuit for a color television receiver set and, more particularly, to a color saturation and contrast adjusting circuit referred to hereinafter as a saturation and contrast adjusting circuit, wherein a color processing circuit is branched off from the output stage of a contrast adjusting circuit having its input state connected to a video receiver circuit of the color television receiver set.

BACKGROUND TECHNOLOGY

Hitherto, there has been known a saturation and contrast adjusting circuit for a color television receiver set, which comprises, as shown in FIG. 1, a contrast adjusting circuit YG connected between a video detector Vd, having an input terminal VIF adapted to receive a video intermediate frequency, and a video amplifier AY, said video detector Vd having a chroma processing circuit CH leading therefrom, which chroma processing circuit CH includes a band pass transformer BPT followed by an ACC amplifier ACC which is in turn connected to a color saturation adjusting circuit SC via gain adjusting circuit CG, so that the gain adjusting circuit CG is connected between the ACC amplifier ACC and the color saturation adjusting circuit SC, whereby the gain of each of the contrast adjusting circuit YG and the gain adjusting circuit CG can be controlled by a controlled adjusting voltage applied through a common manually variable resistor VR generally referred to as a uni-color volume, so that both contrast and the color saturation can be simultaneously adjusted manually.

In FIG. 1, DM is a color demodulating circuit and MTX is a matrix circuit.

In the saturation and contrast adjusting circuit of the type described above, it is required to employ two independent gain control circuits one for each of the contrast adjusting circuit YG and the gain adjusting circuit CG, resulting in the increased cost and also in such a disadvantage that control characteristic curves of said contrast adjusting circuit YG and the gain adjusting circuit CG, included in the color processing circuit, relative to the controlled voltage given by the variable resistor VR do not coincide with each other completely.

The present invention has been developed with a view to eliminate the above described disadvantage inherent in the conventional saturation and contrast adjusting circuit for a color television receiver set and has for its object to provide a saturation and contrast adjusting circuit wherein the chroma processing circuit is led from the contrast adjusting circuit to make it possible to adjust both the saturation and the contrast by the use of a single gain adjusting circuit with control curves of the brightness and saturation contrast adjusting circuit completely coinciding with each other and which is low in cost.

Another object of the present invention is to provide a saturation and contrast adjusting circuit wherein, by maximizing the gain of the gain adjusting circuit of the contrast adjusting circuit during at least the burst period independently of a control signal of the contrast adjusting circuit, the amplitude of a burst signal can be made free from any influence the gain of said gain adjusting circuit may bring about, and which is so designed as to lessen the deterioration of the differential gain characteristic and the differential phase attributable to amplification in the side of the chroma processing circuit.

DISCLOSURE OF THE INVENTION

That is, the present invention is such that the control signal of the contrast adjusting circuit arranged in the front stage of the chroma processing circuit is released during the burst period so that the contrast and the saturation can be controlled by said control signal.

As hereinabove described, the arrangement of the contrast adjusting circuit in the front stage of the chroma processing circuit makes it possible to adjust the saturation and the contrast by the use of the only gain adjusting circuit and is effective not only to reduce the cost, but also to completely coincide the control curves of the brightness and saturation contrast adjusting circuit with each other.

In addition, in a preferred embodiment of the present invention, the contrast adjusting circuit is provided with a gain adjusting circuit wherein the amplification degree of a composite video signal can be varied by the control signal, and an adjustment releasing circuit for setting gain of the gain adjusting circuit to a maximum value during at least the burst period independently of the control signal.

The adjustment releasing circuit referred to above is preferably so designed as to be brought in a conductive state by a control signal synthesized from pulses fed from a horizontal synchronizing circuit of count-down system whereby the gain of the gain adjusting circuit can be maximized by said control signal during the burst period and also during a period close to the burst period.

Accordingly, the amplitude of the burst signal which is controlled always to a constant value in the chroma processing circuit is not affected by the gain of said gain adjusting circuit and it is possible lessen the deterioration of the differential gain characteristic and the differential phase attributable to the amplification in the side of the chroma processing circuit.

It is also desirable to provide a saturation and contrast adjusting circuit so constructed that a control signal of a contrast adjusting circuit arranged in the front stage of a chroma processing circuit is released during the burst period to enable the contrast and saturation adjustment to be carried out by said control signal, said contrast adjusting circuit being arranged after a direct current regenerating circuit for producing a video output having a pedestal level clamped at a predetermined level.

BEST MODE FOR CARRYING OUT THE INVENTION

Hereinafter, the present invention will be described in detail with reference to the accompanying drawings.

Figure 1:
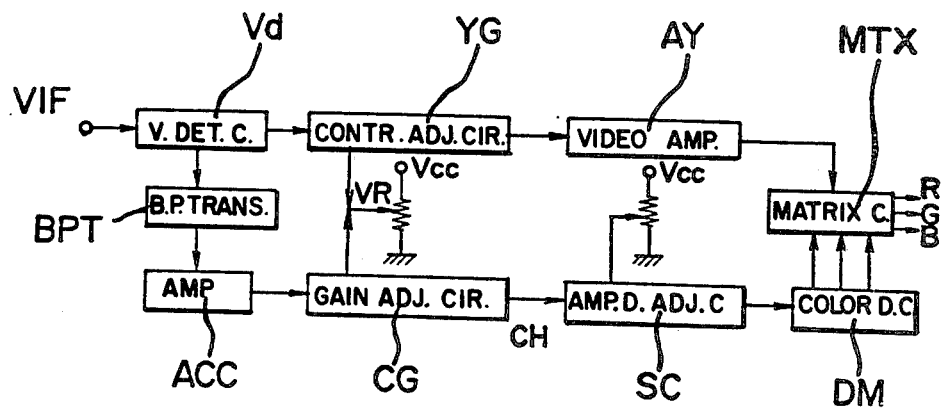
FIG. 1 is a block diagram of the conventional saturation and contrast adjusting circuit for a color television receiver set.
Figure 2:
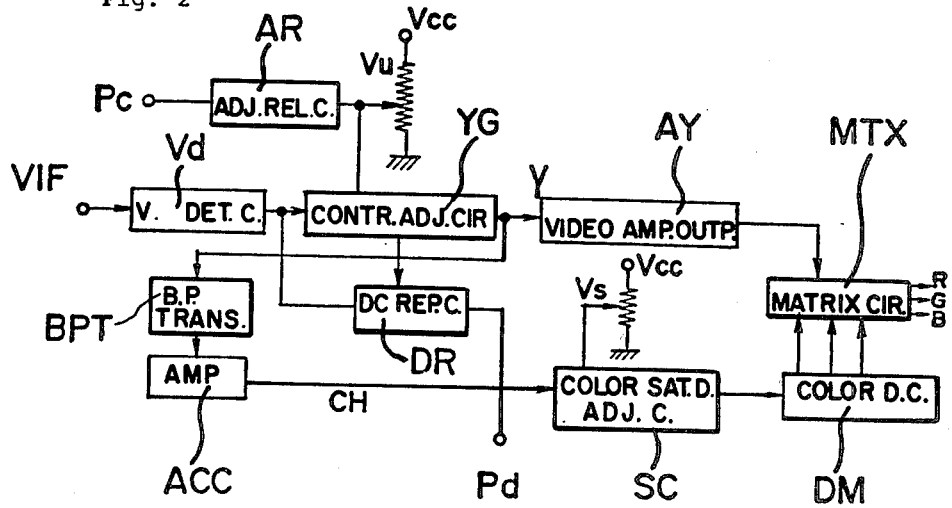
FIG. 2 is a block diagram of a saturation and contrast adjusting circuit for a color television receiver set according to the present invention.

FIG. 2 illustrates a circuit block diagram of the saturation and contrast adjusting circuit to which the present invention pertains.

As can be seen from FIG. 2, a video detector Vd is followed by a contrast adjusting circuit YG only and a chroma processing circuit CH is branched off of the contrast adjusting circuit YG at a position where the latter leads to a video signal processing circuit Y.

While the details of the contrast adjusting circuit YG will be described later with reference to FIG. 3, the contrast adjusting circuit YG basically comprised, in addition to a direct current regenerating circuit DR and a gain adjusting circuit GA (see FIG. 3), an adjustment release circuit AR (See FIG. 3) for adjusting the gain of said gain adjusting circuit GA during the burst period by the utilization of a pulse satisfying a predetermined condition as will be described later, to a predetermined value (the maximum gain in this embodiment) without depending on, and rather independently of, a controlled voltage determined by a manually variable resistor Vu.

An output from the contrast adjusting circuit YG is applied to a matrix circuit MTX through a video amplifier output stage AY. On the other hand, a chroma signal component is applied to a color saturation adjusting circuit SC through a bandpass transformer BPT and then through an ACC amplifier ACC and is further applied to a color demodulating circuit DM after the color saturation has independently been adjusted by a manually variable resistor VS.

Those circuits following the contrast adjusting circuit YG may be of a construction similar to those used according to the prior art and the details thereof are herein omitted accordingly.

Figure 3:
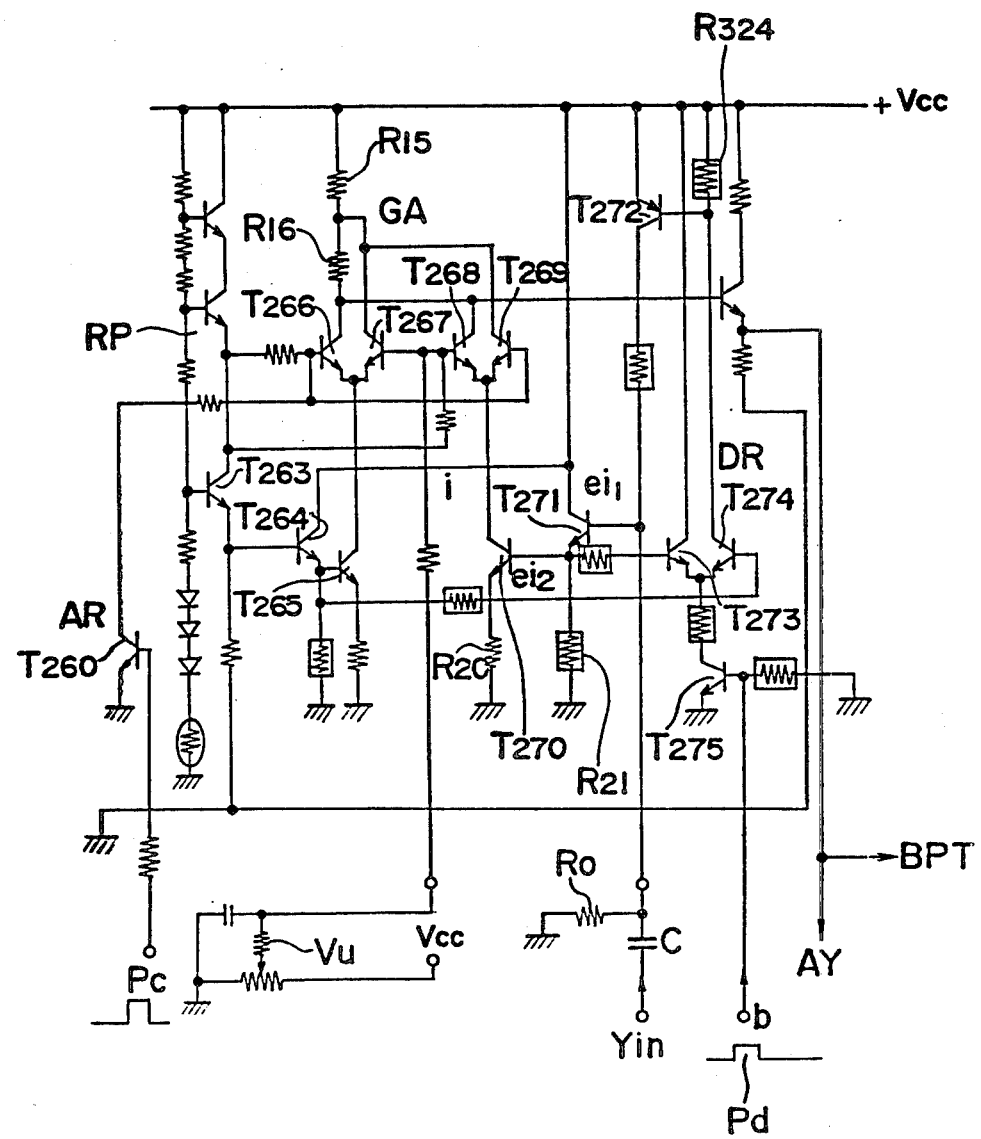
FIG. 3 is a diagram showing an essential circuit portion in one embodiment of the present invention.

Referring now to FIG. 3, the details of the contrast adjusting circuit YG will be described.

The contrast adjusting circuit YG can be understood as including the gain adjusting circuit GA of double-balanced connection designed to stabilize the pedestal level of an amplified composite video output, and the adjustment releasing circuit AR operable to maximize the gain of the gain adjusting circuit GA at the time an output signal from the direct current regenerating circuit DR and the control signal are applied thereto.

One of the transistors T265 and T270 forming a constant current source for differential pairs of transistors T266, T267 and T268, T269 connected in double-balanced fashion to form the gain adjusting circuit GA is base-biased through an emitter-follower T263 connected to a constant voltage source RP, whereas the base of the other transistor T270 is connected to a source of video signal (video detector Vd) through a capacitor C of relatively large capacitance and is not biased by a direct current.

For providing a direct current regenerating voltage to the base of a transistor T271 having its emitter connected to the base of the transistor T270, the collector-emitter circuit of a transistor T272 is inserted between the base of the transistor T271 and an electrical power source Vcc, the base voltage of which is controlled indirectly by a direct current regenerating pulse Pd. That is to say, it is so designed as to apply the direct regenerating pulse to a terminal connected to the base of a constant current transistor T275 forming a common emitter path of a differential pair of transistors T273 and T274 designed so as to apply its unbalanced output to the base of the transistor T272. The base of the transistor T274 forming the differential pair together with the transistor T273 is biased by a direct current fed through the emitter-follower T264 and, accordingly, when the transistor T275 is activated to a saturation level by the receipt of the direct current regenerating pulse Pd, the transistor T274 is also brought in a conductive state, accompanied by a voltage drop across a resistor (10 kΩ) R324 which results in conduction of the transistor T272 on the one hand and charging of the capacitor C to a predetermined potential on the other hand. After the charging of the capacitor C to the predetermined voltage, the transistor T271 conducts accompanied by conduction of the transistor T273.

Upon conduction of the transistor T273 forming the differential pair together with the transistor T274, the transistor T274 is brought in a non-conductive state, thereby disconnecting the transistor T272 to interrupt the charging of the capacitor C. After the lapse of the duration of the direct current regenerating pulse, the charged potential of the capacitor C is discharged through a resistor Ro, the direct current voltage level at the base of the transistor T271 is maintained at a pedestal level by setting each constant to regenerate a direct current component of the video signal to be applied to the base of the transistor T271.

In the next place, the gain adjusting circuit GA will be described. The voltage ei2 of the video signal to be applied to the base of the transistor T270 will become approximately equal to the voltage ei1 of the video signal to be applied to the base of the transistor T271, provided that the differential resistance re of the emitter of the transistor T271 is neglected. The collector current i of a signal current of the transistor T270 is expressed by the following equation.

$$i = \frac{ei1}{re + R21} \quad (1)$$

Assuming that the contrast adjustment volume Vu is set to a maximum position, the transistor T268 is brought in a conductive state with the transistor T269 in a non-conductive state. At this time, the current flowing through the transistor T268 is i from the equation (1) and, therefore, the collector voltage, i.e., output voltage e01, of the transistor T268 is given by the following equation.

$$e01 = (R15 + R16)i = \frac{R15 + R16}{re + R21} \times ei1 \quad (2)$$

Accordingly, the maximum voltage gain of this circuit is given:

$$\frac{e0}{ei1} = \frac{R15 + R16}{re + R21} \quad (3)$$

On the other hand, if the volume Vu is set to a minimum position, the transistor T268 is brought in a non-conductive state with the transistor T269 in a conductive state and, therefore, the output voltage e02 becomes:

$$e02 = \frac{R16}{re + R21} \times ei1 \quad (4)$$

Accordingly, the minimum voltage gain of this circuit is expressed as follows:

$$\frac{e02}{ei1} = \frac{R16}{re + R21} \quad (5)$$

It is to be noted that a voltage gain intermediate between the maximum and minimum value is determined by the ratio of division of the current between the transistors T268 and T269 determined by the setting of the volume Vu, the respective resistances of the resistor R21, R15 and R16, and the ratio between the resistance of the resistor R1 and the total resistance of the resistors R15+R16 (however, re<<R21 being required.).

As is well known, the ACC circuit in the chroma processing circuit CH is operable to fix the amplitude of the burst signal to a constant value. Accordingly, the amplitude of the burst signal must be maintained at a constant value so that it will not be adversely affected by the gain of the gain adjusting circuit GA.

In the meanwhile, in the conventional color television receiver set, since the burst chroma amplitude of the chroma signal to be supplied to the chroma processing circuit CH is left as fixed on the side of a transmitter, it can not avoid any deterioration of the differential gain, the differential phase, etc., attributable to the characteristics of amplifiers in the chroma processing circuit CH.

The adjusting releasing circuit AR effective to eliminate such a disadvantage as hereinabove described will now be described.

The adjustment releasing circuit AR is, as will be described later, provided with a switching transistor T260 connecting the base of the transistor T269 to earth and adapted to be brought in a conductive state by a control pulse Pc formed in a horizontal synchronizing circuit HS of a count-down system and is operable to maximize the gain of the gain adjusting circuit GA during the duration of the control pulse Pc; that is, during the burst period and also during a period close to the burst period.

In cooperation with the direct current regenerating circuit DR and the adjustment releasing circuit DR, the gain adjusting circuit GA works as a so-called uni-contrast circuit i.e., a saturation and contrast adjusting circuit.

Condition for the control pulse Pc will now be described. In extreme cases, a burst gating pulse or a flyback pulse may be employed for the control pulse Pc. However, both of these pulses are not desirable by the reasons which will be described below.

Figure 4:
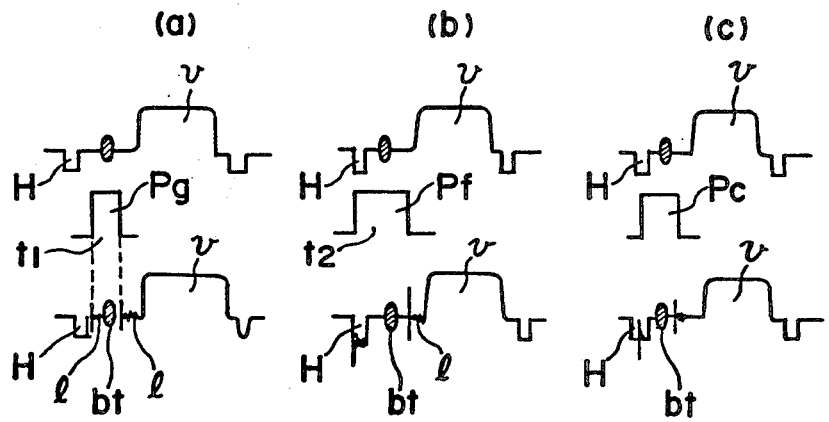
FIGS 4(a), (b) and (c) are diagrams showing respective waveforms of a burst gating pulse, a flyback pulse and a control pulse having its pulse width larger than that of the burst gating pulse and smaller than that of the flyback pulse.

In other words, as shown in FIG. 4(a), if the burst gating pulse Pg appearing at a position t1 relative to the composite video signal V is used, pulses appearing at front and rear edges of this gating pulse in the form of mustache become linkings 1 containing 3.58 MHz components when passed through the bandpass filter, which linkings 1 are superimposed and mixed with the burst signal bt. Therefore, circuits such as ACC, color killer and APC are adversely affected to such an extent as to result in an erroneous operation.

On the other hand, as shown in FIG. 4(b), if the flyback pulse pf appearing at a position t2 relative to the composite video signal V is used, a mustache-shaped portion 1 at its rear edge is delayed during the transmission through the chroma processing circuit CH, resulting in such a disadvantage that it will be reproduced on a picture screen in the form of a guasi-chroma signal.

In consideration of these disadvantages, it can be contemplated to use the control pulse Pc synthesized by delaying a horizontal synchronizing signal H so as to have a duration larger than the width of the burst gating pulse bt, but smaller than that of the flyback pulse pc as shown in FIG. 4(c).

However, in such case, it is not desirable because, where the horizontal synchronizing pulse disappears such as when in a weak electric field, the uni-color function itself is adversely affected. In view of this, it is preferred to synthesize the control pulse Pc by logically combining count-down outputs where the horizontal synchronizing circuit of count-down system is employed.

Hereinafter, a synthesizing circuit for the control pulse Pc will be described with reference to FIG. 5.

The horizontal synchronizing circuit HS includes a ceramics filter Fs and is basically constituted by a variable oscillator circuit VCO operable to oscillate at a center frequency of 32 fH (wherein fH represents the horizontal oscillating frequency, a count-down circuit CD for counting down the output from the variable oscillator circuit VCO by the decrement of 32, and a phase comparing circuit PH.

The count-down circuit CD is constituted by five flip-flop circuits F1 to F5 connected in cascade fashion, the 32fH output from the variable oscillator circuit VCO being after having been inverted by a transistor T144, supplied as a trigger signal to the flip-flop circuit F1 while a horizontal synchronizing pulse of 50% in duty ratio and having a frequency of fH is generated from a Q output of the flip-flop circuit F5.

Figure 5:
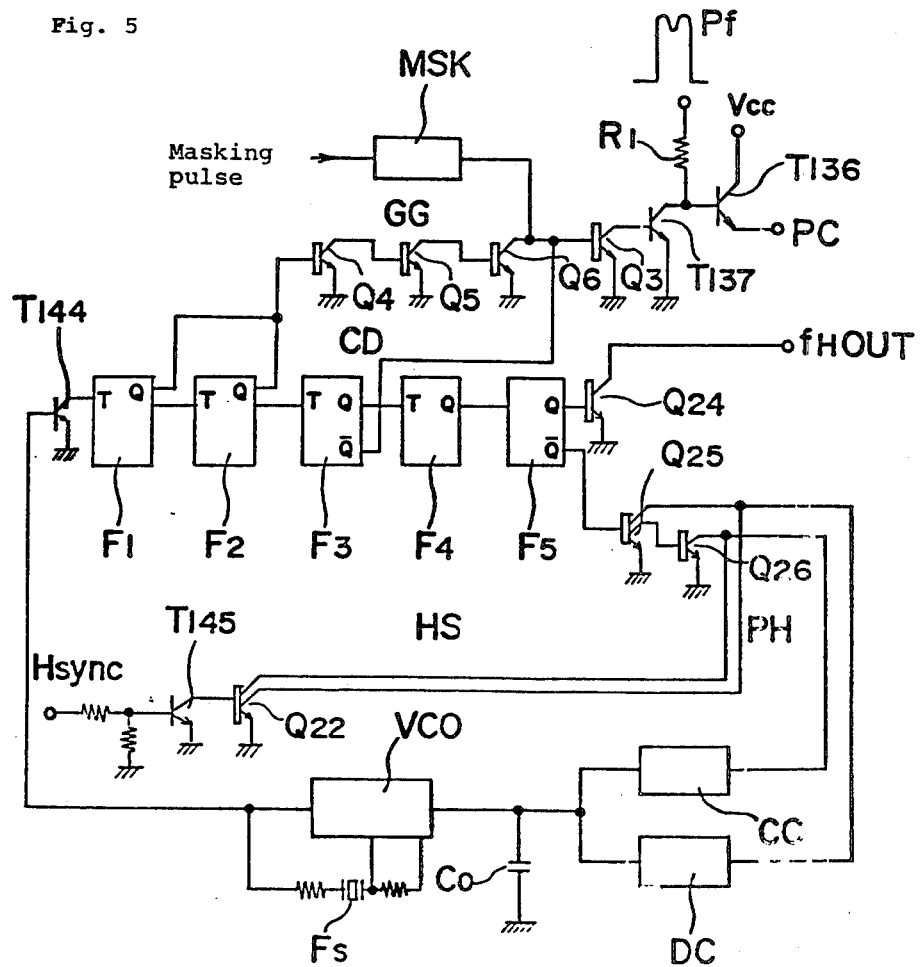
FIG. 5 is a diagram showing a circuit for synthesizing the control pulse.

It is to be noted that, in the circuit of FIG. 5, each of the transistors, the base of which is shown by a rectangular bar, is fabricated in I²L type, so a symbol different from that in FIG. 3 is employed.

The phase comparing circuit PH comprises a transistor Q25 adapted to receive a $\overline{Q}$ output from the flip-flop circuit F5 and to generate an inverted output Q thereof, a transistor Q26 for generating an inverted output $\overline{Q}$ thereof, and a circuit including transistors T144, Q22, etc., for supplying to the respective collectors of the transistors Q25 and Q26 the horizontal synchronizing signals Hsync of the same polarity which have been separated from the composite video signal and is so designed as to generate at the collectors of the respective transistors Q25 and Q26 as a sort of error signal an output indicative of the logical product of the collector outputs thereof and the horizontal synchronizing signal.

The output indicative of the logical product which appears at the collector of the transistor Q26 and the output indicative of the logical product which appears at the collector of the transistors Q26 are respectively applied to a charge control circuit CC and a discharge control circuit DC so that the amount of charge on a capacitor C₀, i.e., the terminal voltage can be controlled. The pulse width of each of the outputs indicative of the logical product appearing at the respective collectors of the transistors Q25 and Q26 varies depending on the detected phase error and, therefore, the terminal voltage of the capacitor C₀ controls a variable phase shifting circuit and/or a frequency control circuit of the variable oscillator circuit VCO to cause the frequency and the phase of the output of VCO to coincide with the central point of the horizontal synchronizing signal of the video signal supplied.

Hereinafter, a synthesizing circuit GG for synthesizing the control pulse by the utilization of the flyback pulse and the outputs from the flip-flop circuits F1 to F5 forming the count-down circuit CD will be described.

Figure 6:
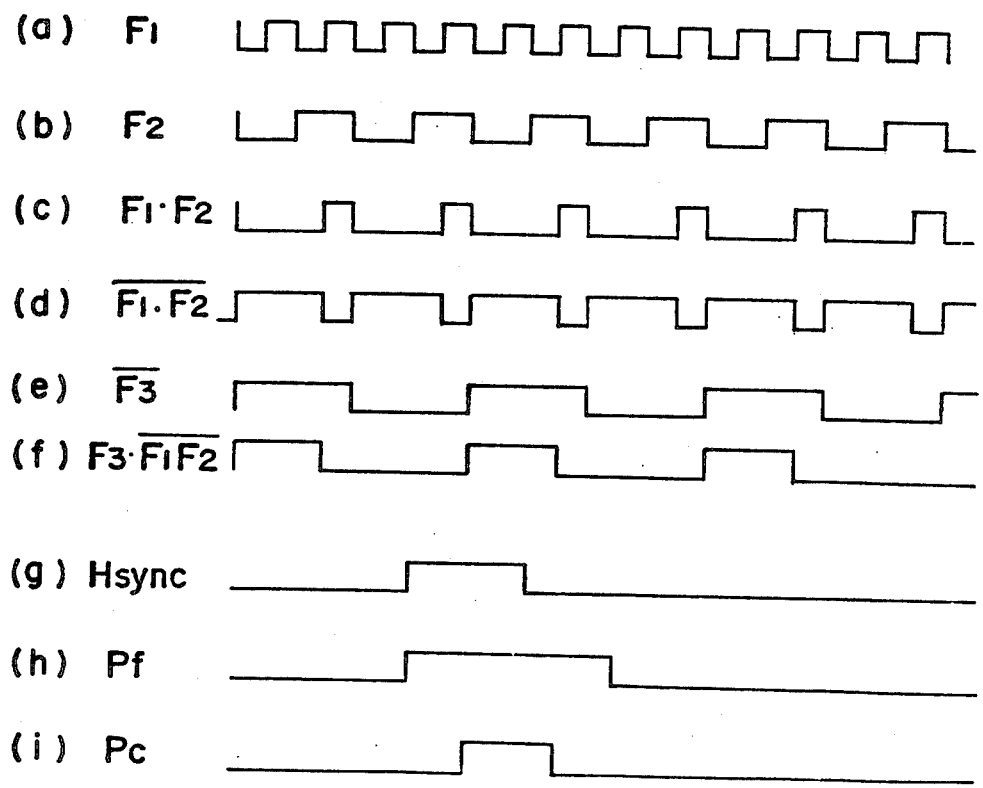
FIGS. 6(a) to 6(i) shows respective waveform of signals appearing in the circuit of FIG. 5 taken for the purpose of explanation of the operation.

Transistors Q4 and Q5 form a logic product circuit for the flip-flop circuits F1 and F2 and, have their bases adapted to receive Q outputs from the flip-flop circuits F1 and F2 as shown in FIGS. 6(a) and 6(b) so that a logic product output as shown in FIG. 6(c) can appear at the collector of the transistor Q5.

A negation of the logic product output appearing at the collector of the transistor Q6 (See FIG. 6(d)) is fed to a transistor T137 through a transistor Q3 together with a marking pulse and a $\overline{Q}$ output from the flip-flop circuit F3 so that the control pulse Pc can be drawn from the emitter of a transistor T136 through the collector of the transistor T137 in the form of the logical product of the negation of the logic product output, the marking pulse, the $\overline{Q}$ output from the flip-flop circuit F3 and the flyback pulse.

Since the variable oscillator circuit VCO being 32fH as hereinbefore described as controlled to synchronize with the center of the horizontal synchronizing signal H (See FIG. 6(g)), it is easy to locate the front edge of the control pulse Pc during the duration of the horizontal synchronizing signal and to locate the rear edge thereof at a position preceding the rear edge of the flyback pulse Pl thereby to satisfy the previously mentioned conditions.

In this way as hereinabove described, the control pulse Pc for the adjustment releasing circuit AR can be obtained.

It is to be noted that, in FIG. 5, the masking circuit MSK is operable to erase this control pulse Pc during the duration of the vertical synchronizing signal including the period of an equivalent pulse included in the composite video signal.

Although the basic embodiment of the present invention has been set forth in the foregoing description, the present invention should not be limited to such embodiment, but can be modified in any way within the scope of the appended claims.

I claim:

1. A saturation and contrast adjusting circuit so constructed that a control signal of a contrast adjusting circuit arranged in the front stage of a chroma processing circuit is released during the burst period to enable the contrast and saturation adjustment to be carried out by said control signal, said contrast adjusting circuit being arranged after a direct current regenerating circuit for producing a video output having a pedestal level clamped at a predetermined level.

2. A saturation and contrast adjusting circuit as defined in claim 1, characterized in that said contrast adjusting circuit comprises a gain adjusting circuit wherein the amplification degree of a composite video signal is varied by said control signal, and an adjustment releasing circuit for maximizing the gain of said gain adjusting circuit during at least said burst period irrespective of said control signal.

3. A saturation and contrast adjusting circuit as defined in claim 1 or 2, characterized in that said adjustment releasing circuit is adapted to receive said control pulse from a control pulse synthesizing circuit for synthesizing the control pulse from a pulse signal taken from a horizontal synchronizing circuit of count-down system, said control pulse having a pulse width larger than that of a burst gating pulse, but smaller than that of a flyback pulse.

* * * * *